United States Patent
Sugiura

(10) Patent No.: US 11,870,114 B2
(45) Date of Patent: Jan. 9, 2024

(54) FUEL CELL SYSTEM AND METHOD OF CONTROLLING FUEL CELL SYSTEM

(71) Applicant: HONDA MOTOR CO., LTD., Tokyo (JP)

(72) Inventor: Seiji Sugiura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/665,619

(22) Filed: Feb. 7, 2022

(65) Prior Publication Data

US 2022/0302484 A1    Sep. 22, 2022

(30) Foreign Application Priority Data

Mar. 19, 2021 (JP) ................ 2021-045534

(51) Int. Cl.
| | | |
|---|---|---|
| *H01M 8/04* | (2016.01) | |
| *H01M 8/04746* | (2016.01) | |
| *H01M 8/0438* | (2016.01) | |
| *H01M 8/04089* | (2016.01) | |

(52) U.S. Cl.
CPC ... *H01M 8/04753* (2013.01); *H01M 8/04089* (2013.01); *H01M 8/04388* (2013.01); *H01M 8/04395* (2013.01); *H01M 8/04783* (2013.01)

(58) Field of Classification Search
CPC ......... H01M 8/04753; H01M 8/04089; H01M 8/04388; H01M 8/04395
See application file for complete search history.

(56) References Cited

U.S. PATENT DOCUMENTS

2014/0212780 A1* 7/2014 Furusawa ......... H01M 8/04388
                                                429/429
2020/0185736 A1* 6/2020 Ito .................. H01M 8/04955

FOREIGN PATENT DOCUMENTS

| JP | 2012-133997 | 7/2012 |
|---|---|---|
| JP | 2015-125911 | 7/2015 |
| JP | 2019-087357 | 6/2019 |
| WO | 2007/063826 | 6/2007 |

OTHER PUBLICATIONS

Japanese Notice of Allowance for Japanese Patent Application No. 2021-045534 dated Dec. 23, 2022.

* cited by examiner

*Primary Examiner* — Olatunji A Godo
(74) *Attorney, Agent, or Firm* — Amin, Turocy & Watson, LLP

(57) ABSTRACT

A fuel cell system includes a plurality of fuel cell stacks, an anode pipeline, a cathode pipeline, an anode discharge valve, a cathode supply valve, a cathode discharge valve, an anode pressure sensor, a cathode pressure sensor, and a control device. The control device determines whether a cross leak that is permeation abnormality of fuel gas or oxidant gas between an anode and a cathode on the basis of a pressure difference, which is difference between a pressure of the fuel gas and a pressure of the oxidant gas detected by the anode pressure sensor and the cathode pressure sensor in a stopped state of electric power generation of the plurality of fuel cell stacks, or a change in the pressure difference.

6 Claims, 3 Drawing Sheets

FUEL CELL SYSTEM AND METHOD OF CONTROLLING FUEL CELL SYSTEM

CROSS-REFERENCE TO RELATED APPLICATION

Priority is claimed on Japanese Patent Application No. 2021-045534, filed Mar. 19, 2021, the content of which is incorporated herein by reference.

BACKGROUND OF THE INVENTION

Field of the Invention

The present invention relates to a fuel cell system and a method of controlling the fuel cell system.

Description of Related Art

In the related art, for example, a fuel cell system configured to determine whether a permeation abnormality (cross leak) of fuel or an oxidant is present between an anode and a cathode according to a change in pressure in an anode system that is sealed upon electric power generation stoppage is known (for example, see Japanese Unexamined Patent Application, First Publication No. 2012-133997).

SUMMARY OF THE INVENTION

Incidentally, in the above-mentioned fuel cell system, since only a pressure in the anode system is detected, for example, when a leakage occurs from a pipeline or the like in the anode system, it is impossible to accurately determine whether a cross leak is present.

An aspect of the present invention is directed to providing a fuel cell system and a method of controlling the fuel cell system that are capable of accurately determining whether a cross leak is present.

In order to solve the problems and accomplish purposes related thereto, the present invention employs the following aspects.

(1) A fuel cell system according to an aspect of the present invention includes a fuel cell configured to generate electric power using fuel supplied to an anode and an oxidant supplied to a cathode; an anode opening/closing part configured to switch between opening and closing of an anode channel in communication with the anode and through which the fuel flows; a cathode opening/closing part configured to switch between opening and closing of a cathode channel in communication with the cathode and through which the oxidant flows: an anode pressure detection part configured to detect a pressure of the fuel in the anode channel; a cathode pressure detection part configured to detect a pressure of the oxidant in the cathode channel; and a control part configured to control switching between opening and closing of each of the anode opening/closing part and the cathode opening/closing part, and to determine whether there is a cross leak that is a permeation abnormality of the fuel or the oxidant between the anode and the cathode on the basis of a pressure difference, which is a difference between the pressure of the fuel and the pressure of the oxidant detected by the anode pressure detection part and the cathode pressure detection part in a stopped state of electric power generation of the fuel cell, or a change in the pressure difference.

(2) The fuel cell system according to the above-mentioned (1) may include a fuel supply part configured to supply the fuel to the anode channel; and an oxidant supply part configured to supply the oxidant to the cathode channel, wherein the control part executes electric power generation using the fuel and the oxidant remaining in the fuel cell by stopping supply of the fuel by the fuel supply part and supply of the oxidant by the oxidant supply part, and then the control part determines whether the cross leak is present on the basis of the pressure difference or the change in the pressure difference in a state in which supply of the fuel by the fuel supply part is executed while the anode opening/closing part is set to an open state and the cathode opening/closing part is set to a closed state.

(3) The fuel cell system according to the above-mentioned (1) or (2) may include a plurality of fuel cells; a plurality of anode opening/closing parts; a plurality of cathode opening/closing parts; a plurality of anode pressure detection parts; and a plurality of cathode pressure detection parts, wherein the control part determines whether the cross leak is present on the basis of the pressure difference or the change in the pressure difference for each of the plurality of fuel cells in a stopped state of electric power generation of the plurality of fuel cells, when electric power generation of at least any one of the plurality of fuel cells is executed, the control part sets the anode opening/closing part and the cathode opening/closing part corresponding to the fuel cell determined to have the cross leak to a closed state, and the control part executes electric power generation of the fuel cell determined to have no cross leak.

(4) The fuel cell system according to the above-mentioned (3) may include a fuel supply part configured to supply the fuel to the anode channels of the plurality of fuel cells; and an oxidant supply part configured to supply the oxidant to the cathode channels of the plurality of fuel cells, wherein the control part sets electric power generation execution and electric power generation stoppage of each of the plurality of fuel cells according to an output requirement, the control part executes electric power generation using the fuel and the oxidant remaining in each of the plurality of fuel cells by stopping supply of the fuel by the fuel supply part and supply of the oxidant by the oxidant supply part, and then the control part determines whether the cross leak is present on the basis of the pressure difference or the change in the pressure difference for each of the plurality of fuel cells in a state in which supply of the fuel by the fuel supply part is executed while simultaneously setting the plurality of anode opening/closing parts to an open state and the plurality of cathode opening/closing parts to a closed state.

(5) A method of controlling a fuel cell system according to an aspect of the present invention is a method of controlling a fuel cell system including a fuel cell configured to generate electric power using fuel supplied to an anode and an oxidant supplied to a cathode; an anode opening/closing part configured to switch between opening and closing of an anode channel in communication with the anode and through which the fuel flows; a cathode opening/closing part configured to switch between opening and closing of a cathode channel in communication with the cathode and through which the oxidant flows; an anode pressure detection part configured to detect a pressure of the fuel in the anode channel; a cathode pressure detection part configured to detect a pressure of the oxidant in the cathode channel; and a control part configured to control switching between opening and closing of each of the anode opening/closing part and the cathode opening/closing part, the method including determining whether there is a cross leak that is a permeation abnormality of the fuel or the oxidant between the anode and the cathode on the basis of a pressure difference, which is a difference between the pressure of the fuel and the pressure of the oxidant detected by the anode pressure detection part and the cathode pressure detection part in a stopped state of electric power generation of the fuel cell, or a change in the pressure difference.

According to the aspect of the above-mentioned (1), since the control part configured to determine whether a cross leak is present on the basis of the pressure of the fuel and the pressure of the oxidant detected by the anode pressure detection part and the cathode pressure detection part is provided, determination accuracy of the cross leak can be improved. For example, in comparison with the case in which the cross leak is determined on the basis of only the pressure of the anode or the pressure of the cathode, leakage in the pipeline or the like can be excluded, and a permeation abnormality of the fuel or the oxidant between the anode and the cathode can be accurately determined.

In the case of the aspect of the above-mentioned (2), since the control part configured to determine whether the cross leak is present after electric power generation using the fuel and oxidant remaining in the fuel cell is executed, it is possible to make detection of a pressure difference between the pressure of the fuel and the pressure of the oxidant detected by the anode pressure detection part and the cathode pressure detection part easier.

In the case of the aspect of the above-mentioned (3), it is possible to continue appropriate electric power generation while preventing leakage of the fuel or the oxidant from the fuel cell determined to have the cross leak to another fuel cell (i.e., a fuel cell determined to have no cross leak).

In the case of the aspect of the above-mentioned (4), even in a case there are a fuel cell in which electric power generation is executed and a fuel cell in which electric power generation is stopped, it is possible to simultaneously determine whether the cross leak is present for the plurality of fuel cells, and it is possible to improve efficiency of supply control of the fuel and the oxidant for the plurality of fuel cells.

According to the aspect of the above-mentioned (5), determination accuracy of the cross leak can be improved by determining whether the cross leak is present on the basis of the pressure of the fuel and the pressure of the oxidant detected by the anode pressure detection part and the cathode pressure detection part. For example, in comparison with the case in which the cross leak is determined on the basis of only the pressure of the anode or only the pressure of the cathode, the leakage from the pipeline or the like can be excluded, and a permeation abnormality of the fuel or the oxidant between the anode and the cathode can be accurately determined.

DETAILED DESCRIPTION OF THE INVENTION

Hereinafter, a fuel cell system 10 according to an embodiment of the present invention will be described with reference to the accompanying drawings.

Figure 1:
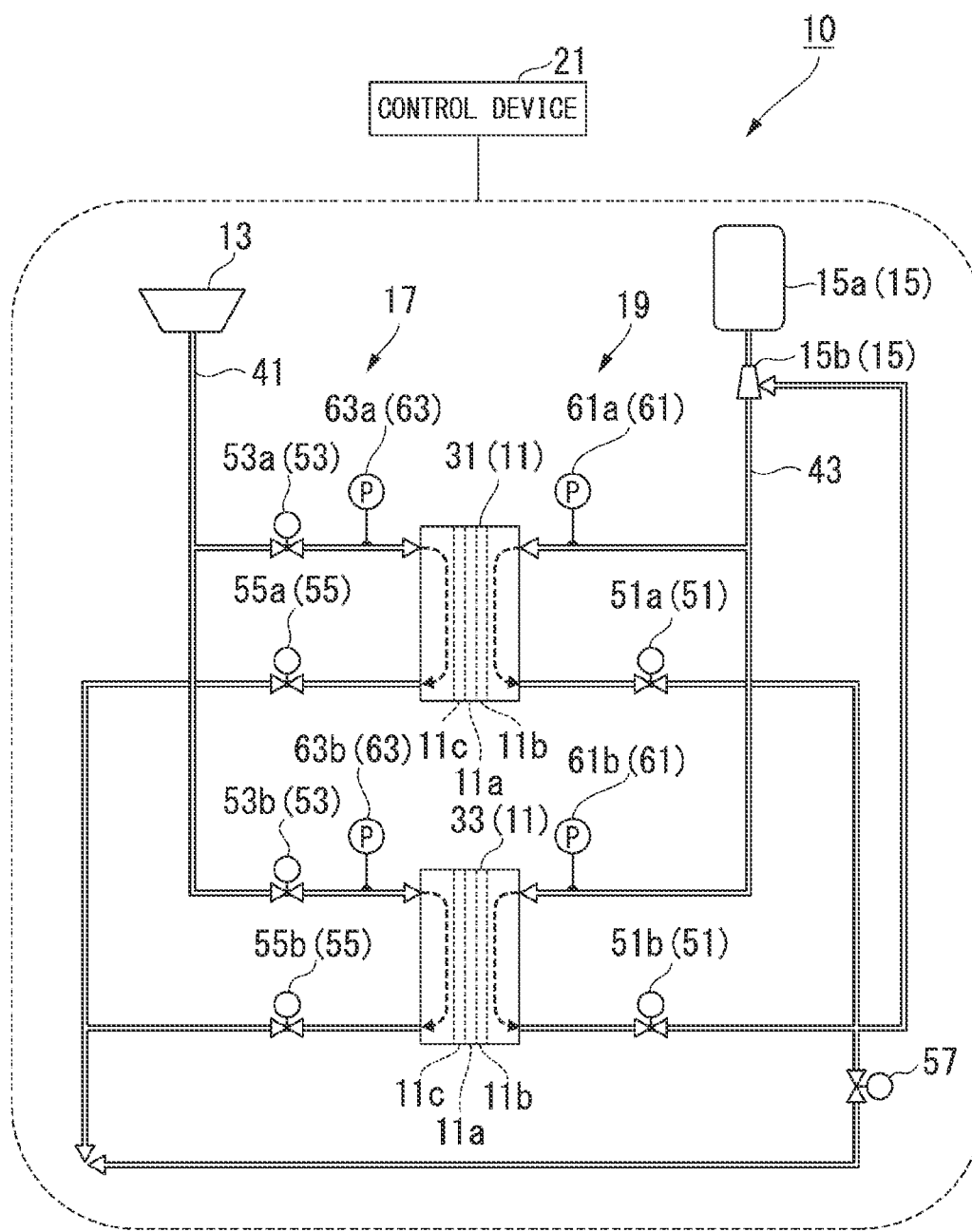
FIG. 1 is a view schematically showing a configuration of a fuel cell system according to an embodiment of the present invention.

FIG. 1 is a view schematically showing a configuration of the fuel cell system 10 of the embodiment.

As shown in FIG. 1, the fuel cell system 10 of the embodiment includes a plurality of fuel cell stacks 11, an air pump (oxidant supply part) 13, a fuel supply part 15, a plurality of valves 17, a plurality of pressure sensors 19, and a control device 21.

The plurality of fuel cell stacks 11 include, for example, a first fuel cell stack 31 and a second fuel cell stack 33. Each of the fuel cell stacks 11 is, for example, a solid high polymer type fuel cell. The solid high polymer type fuel cell includes a plurality of fuel cells that are stacked, and a pair of end plates configured to sandwich a stacked body of the plurality of fuel cells from both sides in a stacking direction. Each of the fuel cells includes an electrolyte electrode structure and a pair of separators configured to sandwich the electrolyte electrode structure. The electrolyte electrode structure includes a solid high polymer electrolyte membrane 11$a$, and a fuel electrode 11$b$ and an oxygen electrode 11$c$ that sandwich the solid high polymer electrolyte membrane 11$a$. The solid high polymer electrolyte membrane 11$a$ includes a cation exchange membrane or the like. The fuel electrode (anode) 11$b$ includes an anode catalyst, a gas diffusion layer, and the like. The oxygen electrode (cathode) 11$c$ includes a cathode catalyst, a gas diffusion layer, and the like.

Each of the fuel cell stacks 11 generates electric power using a catalytic reaction between a fuel gas including hydrogen supplied to the anode 11$b$ from the fuel supply part 15 and an oxidant gas such as air including oxygen or the like supplied to the cathode 11$c$ from the air pump 13.

The air pump 13 is connected to a cathode pipeline (cathode channel) 41 which is in communication with the cathode 11$c$ of each of the plurality of fuel cell stacks 11. The air pump 13 supplies the oxidant gas flowing through the cathode pipeline 41 to the cathode 11$c$ of each of the fuel cell stacks 11.

The fuel supply part 15 is connected to an anode pipeline (anode channel) 43 which is in communication with the anode 11$b$ of each of the plurality of fuel cell stacks 11. The fuel supply part 15 supplies the fuel gas flowing through the anode pipeline 43 to the anode 11$b$ of each of the fuel cell stacks 11.

The fuel supply part 15 includes, for example, a fuel tank 15$a$ configured to receive and store the fuel supplied from an external movable or fixed fuel filling device, an ejector 15$b$ for fuel circulation, and the like. For example, the ejector 15$b$ is disposed between the fuel tank 15$a$ and the anodes 11$b$ of the plurality of fuel cell stacks 11, and mixes at least some unreacted fuel gas discharged from the plurality of anodes 11$b$ with the fuel gas supplied from the fuel tank 15$a$ to supply the mixture to the plurality of anodes 11$b$ again.

The plurality of valves 17 include, for example, an anode discharge valve (anode opening/closing part) 51, a cathode supply valve (cathode opening/closing part) 53, a cathode discharge valve (cathode opening/closing part) 55, and a purge valve 57, which are provided in each of the fuel cell stacks 11.

The anode discharge valve 51 is provided in the anode pipeline 43 on the discharge side of the anode 11$b$ (outlet side) of each of the plurality of fuel cell stacks 11. The anode discharge valve 51 is controlled to be opened and closed by the control device 21, and adjusts a flow rate of the fuel gas from the anode pipeline 43 to the anode 11$b$ of each of the fuel cell stacks 11.

The anode discharge valve 51 includes, for example, a first anode discharge valve 51a of the first fuel cell stack 31 and a second anode discharge valve 51b of the second fuel cell stack 33.

The cathode supply valve 53 is provided in the cathode pipeline 41 on the supply side of the cathode 11c (inlet side) of each of the plurality of fuel cell stacks 11. The cathode discharge valve 55 is provided on the cathode pipeline 41 on the discharge side of the cathode 11c (outlet side) of each of the plurality of fuel cell stacks 11. Each of the cathode supply valve 53 and the cathode discharge valve 55 is controlled to be opened and closed by the control device 21, and switches between sealing and opening of the cathode pipeline 41.

The cathode supply valve 53 includes, for example, a first cathode supply valve 53a of the first fuel cell stack 31 and a second cathode supply valve 53b of the second fuel cell stack 33. The cathode discharge valve 55 includes, for example, a first cathode discharge valve 55a of the first fuel cell stack 31 and a second cathode discharge valve 55b of the second fuel cell stack 33.

The purge valve 57 is provided in the anode pipeline 43 downstream from the plurality of anode discharge valves 51. The purge valve 57 is controlled to be opened and closed by the control device 21, and discharges water, which is generated by electric power generation of the fuel cell stacks 11, and nitrogen, which has permeated from the cathode 11c to the anode 11b of each of the fuel cell stacks 11, from the anode pipeline 43.

The plurality of pressure sensors 19 include, for example, an anode pressure sensor (anode pressure detection part) 61 and a cathode pressure sensor (cathode pressure detection part) 63 provided on each of the fuel cell stacks 11.

The anode pressure sensor 61 is provided in the anode pipeline 43 on the supply side of the anode 11b (inlet side) of each of the plurality of fuel cell stacks 11. The anode pressure sensor 61 detects a pressure of the fuel gas flowing through the anode pipeline 43, and outputs a signal of a detected value of the pressure. The anode pressure sensor 61 includes, for example, a first anode pressure sensor 61a of the first fuel cell stack 31 and a second anode pressure sensor 61b of the second fuel cell stack 33. The cathode pressure sensor 63 is provided in the cathode pipeline 41 on the supply side of the cathode 11c (inlet side) of each of the plurality of fuel cell stacks 11. The cathode pressure sensor 63 detects a pressure of the oxidant gas flowing through the cathode pipeline 41, and outputs the signal of the detected value of the pressure. The cathode pressure sensor 63 includes, for example, a first cathode pressure sensor 63a of the first fuel cell stack 31 and a second cathode pressure sensor 63b of the second fuel cell stack 33.

The control device 21 integrally controls, for example, operations of the fuel cell system 10.

The control device 21 is a software function part that functions as a predetermined program is executed by a processor such as a central processing unit (CPU) or the like. The software function part is an electronic control unit (ECU) including a processor such as a CPU or the like, a read only memory (ROM) in which a program is stored, a random access memory (RAM) on which data is temporarily stored, and an electronic circuit such as a timer or the like. At least a part of the control device 21 may be an integrated circuit such as large scale integration (LSI) or the like.

The control device 21 controls, for example, opening and closing of the plurality of valves 17 according to various operation modes of the fuel cell system 10.

For example, the control device 21 determines whether a cross leak of each of the fuel cell stacks 11 is present on the basis of the signal of the detected value of the pressure received from the anode pressure sensor 61 and the cathode pressure sensor 63 of each of the plurality of fuel cell stacks 11. The cross leak is permeation abnormality of the fuel gas or the oxidant gas between the anode 11b and the cathode 11c of each of the fuel cell stacks 11, and for example, due to abnormality such as damage or the like of the solid high polymer electrolyte membrane 11a, excessive permeation that exceeds a predetermined transmission level of the fuel gas or the oxidant gas generated in the normal solid high polymer electrolyte membrane 11a occurs.

Hereinafter, a method of controlling a fuel cell system 10 according to the embodiment, i.e., a control operation executed by the control device 21 will be described.

Figure 2:
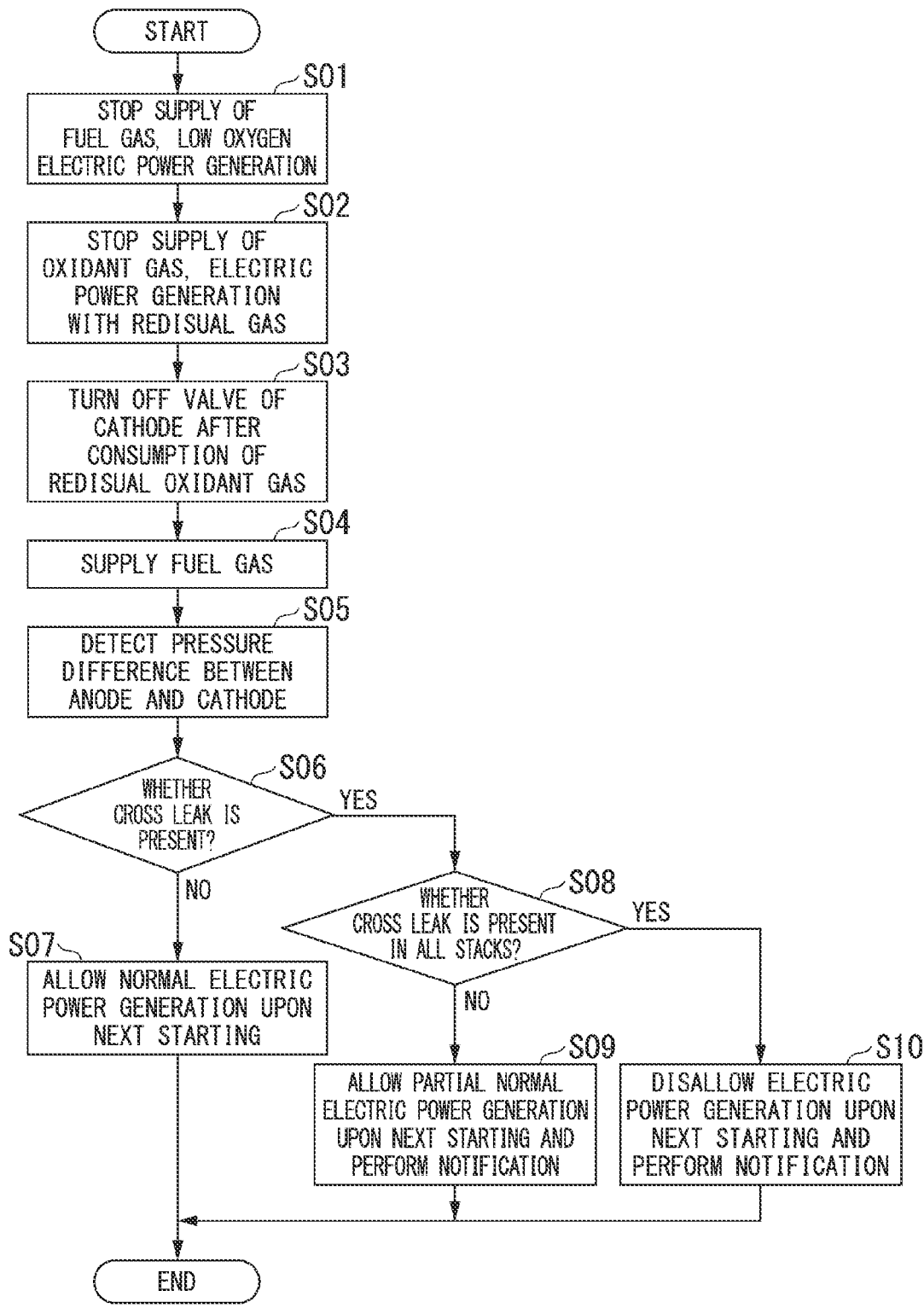
FIG. 2 is a flowchart showing an operation of the fuel cell system according to the embodiment of the present invention.

FIG. 2 is a flowchart showing an operation of the fuel cell system 10 according to the embodiment.

A series of processing from step SO1 to step S10 shown in FIG. 2 is executed when electric power generation of the fuel cell system 10 is stopped, for example, like the case in which an ignition switch of a vehicle in which the fuel cell system 10 is mounted is set to OFF.

First, in step S01, the control device 21 executes low oxygen power generation that continues electric power generation using the fuel gas remaining in the fuel cell stacks 11 in a state in which the output of the air pump 13 is reduced while supply of the fuel gas is stopped by the fuel supply part 15. The low oxygen electric power generation is electric power generation in a state in which a stoichiometric value of oxygen of oxidant gas(=theoretical oxygen consumption amount corresponding to oxygen supply amount/ electric power generation current) is set to a value lower than a reference value upon normal electric power generation (for example, 1 or the like). In the low oxygen power generation, as shown in the following Table 1, the anode discharge valves 51a and 51b, the cathode supply valves 53a and 53b and the cathode discharge valves 55a and 55b are set to an open state (ON).

TABLE 1

|  | Supply oxidant | First cathode supply valve | First cathode discharge valve | Second cathode supply valve | Second cathode discharge valve | Fuel supply | First anode discharge valve | Second anode discharge valve |
|---|---|---|---|---|---|---|---|---|
| Normal electric power generation: low load (partial operation) | ON | ON | ON | OFF | OFF | ON | ON | OFF |
| Normal electric power generation: high load (total operation) | ON | ON | ON | ON | ON | ON | ON | ON |
| Low oxygen electric | ON | ON | ON | ON | ON | OFF | ON | ON |

TABLE 1-continued

|  | Supply oxidant | First cathode supply valve | First cathode discharge valve | Second cathode supply valve | Second cathode discharge valve | Fuel supply | First anode discharge valve | Second anode discharge valve |
|---|---|---|---|---|---|---|---|---|
| power generation Stop processing | OFF | ON | ON | ON | ON | OFF | ON | ON |
| Cross leak inspection | OFF | OFF | OFF | OFF | OFF | ON | ON | ON |
| Partial normal electric power generation | ON | ON | ON | OFF | OFF | ON | ON | OFF |

Next, in step S02, the control device 21 executes stop processing that continues electric power generation using the fuel gas and the oxidant gas remaining in the fuel cell stacks 11 (residual gas) by stopping supply of the oxidant gas by the air pump 13. In the stop processing, as shown in the above-mentioned Table 1, like the low oxygen electric power generation, the anode discharge valves 51a and 51b, the cathode supply valves 53a and 53b and the cathode discharge valves 55a and 55b are set to an open state (ON).

Next, in step S03, the control device 21 sets the cathode supply valves 53a and 53b and the cathode discharge valves 55a and 55b to a closed state (OFF) after the oxidant gas remaining in the fuel cell stacks 11 is consumed. The control device 21 detects whether the oxidant gas remaining in the fuel cell stacks 11 is consumed on the basis of the detected value of the electric power generation voltage (or electric generated output) of each of the fuel cell stacks 11.

Next, in step SO4, the control device 21 starts supply of the fuel gas by the fuel supply part 15. In this case, like the cross leak inspection shown in the above-mentioned Table 1, the cathode supply valves 53a and 53b and the cathode discharge valves 55a and 55b are set to a closed state (OFF), and the anode discharge valves 51a and 51b are set to an open state (ON).

Next, in step S05, the control device 21 detects a pressure difference that is a difference between the pressure of the fuel gas of the anode 11b and the pressure of the oxidant gas of the cathode 11c on the basis of the signals of the detected values of the pressure outputs from the anode pressure sensor 61 and the cathode pressure sensor 63 in each of the first fuel cell stack 31 and the second fuel cell stack 33.

Next, in step S06, the control device 21 determines whether the cross leak of each of the fuel cell stacks 11 is present on the basis of the pressure difference or a change in pressure difference detected in step S05. When the determination result is "YES," i.e., when the cross leak occurs in at least any one of the fuel cell stacks 11, the control device 21 advances the processing to step S08. Meanwhile, when the determination result is "NO," i.e., when the cross leak does not occur in any one of the fuel cell stacks 11, the control device 21 advances the processing to step S07.

Figure 3:
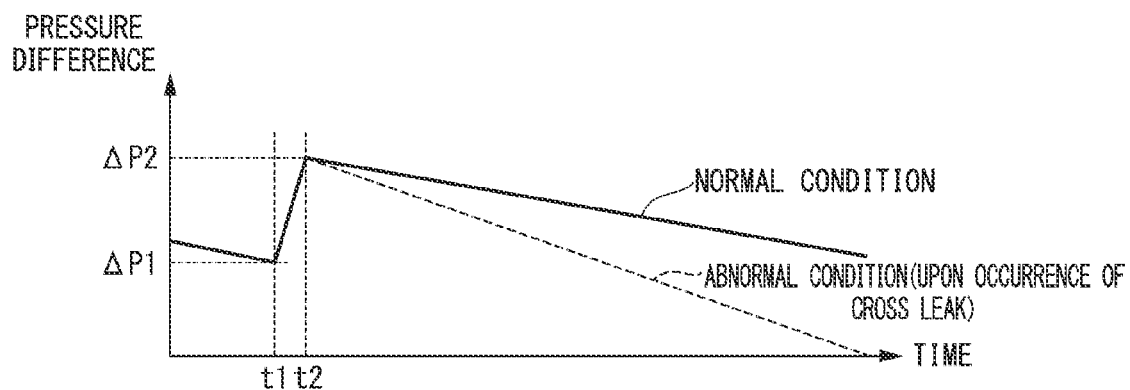
FIG. 3 is a view showing an example of fuel supply of a fuel cell system according to the embodiment of the present invention upon cross leak determination and a time change of a pressure difference between an anode and a cathode.

FIG. 3 is a view showing an example of fuel supply of the fuel cell system 10 of the embodiment upon cross leak determination and a time change in pressure difference between the anode 11b and the cathode 11c.

As shown in FIG. 3, when supply of the fuel gas by the fuel supply part 15 is started upon cross leak inspection, for example, a pressure difference between the anode 11b and the cathode 11c is increased from a pressure difference ΔP1 at a time t1 toward a pressure difference ΔP2 at a time t2. Then, after the time t2 when supply of the fuel gas by the fuel supply part 15 is stopped, the pressure difference between the anode 11b and the cathode 11c changes to a downward trend. The control device 21 determines that the cross leak occurs, for example, when a decrease in pressure difference after the time t2 is greater than the change upon normal condition.

Next, in step S07, the control device 21 allows the normal electric power generation upon the next starting of the fuel cell system 10 and advances the processing to end.

In the normal electric power generation upon the next starting, the control device 21 switches and selects the normal electric power generation: low load (partial operation) or the normal electric power generation: high load (total operation) shown in the above-mentioned Table 1 according to the output requirement.

For example, in the normal electric power generation: low load (partial operation) selected when the output requirement is less than the predetermined threshold, the first anode discharge valve 51a, the first cathode supply valve 53a and the first cathode discharge valve 55a are set to an open state (ON), the second anode discharge valve 51b, the second cathode supply valve 53b and the second cathode discharge valve 55b are set to a closed state (OFF), and thus, electric power generation of the first fuel cell stack 31 only is executed.

For example, in the normal electric power generation: high load (total operation) selected when the output requirement is the predetermined threshold or more, the anode discharge valves 51a and 51b, the cathode supply valves 53a and 53b and the cathode discharge valves 55a and 55b are set to an open state (ON), and thus, electric power generation of the first fuel cell stack 31 and the second fuel cell stack 33 is executed.

Next, in step S08, the control device 21 determines whether the cross leak occurs in all the plurality of fuel cell stacks 11.

When the determination result is "YES," the control device 21 advances the processing to step S10. Meanwhile, when the determination result is "NO," the control device 21 advances the processing to step S09.

Next, in step S09, the control device 21 allows partial normal electric power generation that starts only the fuel cell stack 11, which is normal, among the plurality of fuel cell stacks 11 upon the next starting of the fuel cell system 10 (i.e., the fuel cell stack 11 determined as the cross leak not being occurred), and such setting is notified to a user. Then, the processing advances to the end.

In the partial normal electric power generation upon the next starting, when the control device 21 starts the first fuel cell stack 31 only, like the partial normal electric power generation shown in the above-mentioned Table 1, the first anode discharge valve 51a, the first cathode supply valve 53a and the first cathode discharge valve 55a are set to an open state (ON), and the second anode discharge valve 51b, the second cathode supply valve 53b and the second cathode discharge valve 55b are set to a closed state (OFF). The control device 21 increases an electric power generation amount of the first fuel cell stack 31 according to the necessity to satisfy the output requirement. For example, when the control device 21 determines that the cross leak is present in the second fuel cell stack 33 and it is not possible to satisfy the output requirement by not allowing the starting of the second fuel cell stack 33, the control device 21 increases an electric power generation amount of the first fuel cell stack 31 so as to satisfy the output requirement.

In addition, in step S10, the control device 21 sets that starting of all the plurality of fuel cell stacks 11 is not allowed upon the next starting of the fuel cell system 10, and such setting is notified to the user. Then, the processing advances to the end.

As described above, according to the fuel cell system 10 of the embodiment and the method of controlling the fuel cell system 10, determination accuracy of the cross leak can be improved by determining whether the cross leak is present on the basis of the pressure of the fuel gas and the pressure of the oxidant gas detected by the anode pressure sensor 61 and the cathode pressure sensor 63. For example, in comparison with the case in which the cross leak is determined on the basis of only the pressure of the anode 11b or the pressure of the cathode 11c, the leakage from the pipeline or the like can be eliminated, permiation abnormality of the fuel gas or the oxidant gas between the anode 11b and the cathode 11c can be accurately determined.

By determining whether the cross leak is present after electric power generation using the fuel gas and the oxidant gas remaining in the fuel cell stacks 11 is executed, it is possible to make detection of the pressure difference between the pressure of the fuel gas and the pressure of the oxidant gas detected by the anode pressure sensor 61 and the cathode pressure sensor 63 easier.

By disallowing the starting of the fuel cell stacks 11 determined to have the cross leak upon the next starting of the fuel cell system 10, appropriate electric power generation can be continued while preventing leakage of the fuel gas or the oxidant gas from the fuel cell stack 11 determined to have the cross leak to another fuel cell stack 11 (i.e., the fuel cell stack 11 determined to have no cross leak).

(Variant)

Hereinafter, a variant of the embodiment will be described. Further, the same components as the above-mentioned embodiment are designated by the same reference signs and description thereof will be omitted or simplified.

In the above-mentioned embodiment, while the anode discharge valve 51 installed in each of the fuel cell stacks 11 is provided, there is no limitation thereto. For example, instead of the anode discharge valve 51 or in addition to the anode discharge valve 51, a supply valve controlled to be opened and closed may be provided on the inlet side of the anode 11b of each of the fuel cell stacks 11.

In the above-mentioned embodiment, the open state (ON) of the purge valve 57 may be controlled in conjunction with the open state (ON) of at least the first anode discharge valve 51a or the second anode discharge valve 51b.

In the above-mentioned embodiment, opening and closing of the plurality of valves 17 of the fuel cell stacks 11 upon cross leak determination may be simultaneously set for all of the plurality of fuel cell stacks 11. In this case, for example, even when the fuel cell stacks 11 in electric power generation execution and the fuel cell stacks 11 in electric power generation stoppage are present, presence or absence of the cross leak can be simultaneously determined for the plurality of fuel cell stacks 11, efficiency of supply control of the fuel gas and the oxidant gas for the plurality of fuel cell stacks 11 can be improved.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A fuel cell system comprising:
a plurality of fuel cells configured to generate electric power using fuel supplied to an anode and an oxidant supplied to a cathode;
a plurality of anode opening/closing parts configured to switch between opening and closing of an anode channel in communication with the anode and through which the fuel flows;
a plurality of cathode opening/closing parts configured to switch between opening and closing of a cathode channel in communication with the cathode and through which the oxidant flows:
a plurality of anode pressure detection parts configured to detect a pressure of the fuel in the anode channel;
a plurality of cathode pressure detection parts configured to detect a pressure of the oxidant in the cathode channel; and
a control part configured to control switching between opening and closing of each of the anode opening/closing part and the cathode opening/closing part, and to determine whether there is a cross leak that is a permeation abnormality of the fuel or the oxidant between the anode and the cathode on the basis of a pressure difference, which is a difference between the pressure of the fuel and the pressure of the oxidant detected by the anode pressure detection part and the cathode pressure detection part in a stopped state of electric power generation of the fuel cell, or a change in the pressure difference,
wherein downstream of the cathode opening/closing part, the cathode pressure detection part is provided between the cathode and the cathode opening/closing part in the cathode channel.

2. The fuel cell system according to claim 1, comprising:
a fuel supply part configured to supply the fuel to the anode channel; and
an oxidant supply part configured to supply the oxidant to the cathode channel,
wherein the control part executes electric power generation using the fuel and the oxidant remaining in the fuel cell by stopping supply of the fuel by the fuel supply part and supply of the oxidant by the oxidant supply part, and then
the control part determines whether the cross leak is present on the basis of the pressure difference or the change in the pressure difference in a state in which supply of the fuel by the fuel supply part is executed while the anode opening/closing part is set to an open state and the cathode opening/closing part is set to a closed state.

3. The fuel cell system according to claim 1, comprising: wherein
the control part determines whether the cross leak is present on the basis of the pressure difference or the change in the pressure difference for each of the plurality of fuel cells in a stopped state of electric power generation of the plurality of fuel cells, when electric power generation of at least any one of the plurality of fuel cells is executed, the control part sets the anode opening/closing part and the cathode opening/closing part corresponding to the fuel cell determined to have the cross leak to a closed state, and the control part executes electric power generation of a fuel cell determined to have no cross leak.

4. The fuel cell system according to claim 3, comprising:

a fuel supply part configured to supply the fuel to the anode channels of the plurality of fuel cells; and an oxidant supply part configured to supply the oxidant to the cathode channels of the plurality of fuel cells, wherein the control part sets electric power generation execution and electric power generation stoppage of each of the plurality of fuel cells according to an output requirement, the control part executes electric power generation using the fuel and the oxidant remaining in each of the plurality of fuel cells by stopping supply of the fuel by the fuel supply part and supply of the oxidant by the oxidant supply part, and then the control part determines whether the cross leak is present on the basis of the pressure difference or the change in the pressure difference for each of the plurality of fuel cells in a state in which supply of the fuel by the fuel supply part is executed while simultaneously setting the plurality of anode opening/closing parts to an open state and the plurality of cathode opening/closing parts to a closed state.

5. The fuel cell system according to claim 1, wherein p1 downstream of a fuel supply part that supplies the fuel to the anode channel, an anode pressure detection part, of the plurality of anode pressure detection parts, is provided between the anode and the fuel supply part in the anode channel.

6. A fuel cell system comprising:

a plurality of fuel cells configured to generate electric power using fuel supplied to an anode and an oxidant supplied to a cathode;

a plurality of an anode opening/closing parts configured to switch between opening and closing of an anode channel in communication with the anode and through which the fuel flows;

a plurality of cathode opening/closing parts configured to switch between opening and closing of a cathode channel in communication with the cathode and through which the oxidant flows:

a plurality of anode pressure detection parts configured to detect a pressure of the fuel in the anode channel;

a plurality of cathode pressure detection parts configured to detect a pressure of the oxidant in the cathode channel; and a control part configured to control switching between opening and closing of each of the anode opening/closing part and the cathode opening/closing part, and to determine whether there is a cross leak that is a permeation abnormality of the fuel or the oxidant between the anode and the cathode on the basis of a pressure difference, which is a difference between the pressure of the fuel and the pressure of the oxidant detected by the anode pressure detection part and the cathode pressure detection part in a stopped state of electric power generation of the fuel cell, or a change in the pressure difference, wherein downstream of a fuel supply part that supplies the fuel to the anode channel, the anode pressure detection part is provided between the anode and the fuel supply part in the anode channel.

\* \* \* \* \*